(12) United States Patent
Yeh (10) Patent No.: US 9,647,432 B2
(45) Date of Patent: May 9, 2017

(54) QUICK LOCK TUBE SECURING SYSTEM USING CONNECTOR, LOCKING ELEMENT, AND ENGAGING PORTION

(71) Applicant: David Hong Yeh, Mercer Island, WA (US)

(72) Inventor: David Hong Yeh, Mercer Island, WA (US)

( * ) Notice: Subject to any disclaimer, the term of this patent is extended or adjusted under 35 U.S.C. 154(b) by 74 days.

(21) Appl. No.: 14/547,059

(22) Filed: Nov. 18, 2014

(65) Prior Publication Data
US 2015/0136474 A1 May 21, 2015

Related U.S. Application Data

(60) Provisional application No. 61/906,214, filed on Nov. 19, 2013.

(51) Int. Cl.
*H02G 3/06* (2006.01)

(52) U.S. Cl.
CPC .................................. *H02G 3/065* (2013.01)

(58) Field of Classification Search
None
See application file for complete search history.

(56) References Cited

U.S. PATENT DOCUMENTS

| | | | |
|---|---|---|---|
| 384,654 A * | 6/1888 | Wales | A45C 1/12 232/13 |
| 1,592,454 A * | 7/1926 | Frederickson | H02G 3/0616 285/152.1 |
| 1,831,856 A * | 11/1931 | Fullman | H02G 3/06 285/154.4 |
| 2,747,899 A | 5/1956 | Wiltse | |
| 3,285,551 A | 11/1966 | Tschanz | |

(Continued)

FOREIGN PATENT DOCUMENTS

| JP | 2010106993 A | 5/2010 |
|---|---|---|
| JP | 4537224 B2 | 9/2010 |

OTHER PUBLICATIONS

Office Action dated Apr. 27 2015 in U.S. Appl. No. 29/482,009.*

(Continued)

*Primary Examiner* — Jeremy C Norris
*Assistant Examiner* — Muhammed Azam
(74) *Attorney, Agent, or Firm* — Lane Powell PC (57) ABSTRACT

A connecting system for quickly securing a hollow tube to a structure or another hollow tube using a connector that has housing with a tapered interior edge that operably engages a tapered locking wedge received therein. When the tube is inserted into the tapered locking wedge, the locking wedge therein holds and locks the tube in place in the connector. A guide ring may be provided within the connector to facilitate proper alignment of the tube within the connector and provide excellent electrical conductivity throughout the entire tube connecting system. One or more roller bearings may be provided within the wedge to facilitate initial tube insertion and then compression locking of the tube by the wedge. The connector can include a variety of structure engaging portions to allow the connector to be operably secured to a variety of structures such as electrical junction boxes, electrical conduits, tubes, armored cables, metal clad cables, flexible metal cables and the like.

20 Claims, 10 Drawing Sheets

(56) References Cited

U.S. PATENT DOCUMENTS

| | | | |
|---|---|---|---|
| 3,375,485 A * | 3/1968 | Donohue | H01R 9/05 439/581 |
| 3,889,989 A | 6/1975 | Legris | |
| 4,350,840 A * | 9/1982 | Michaels | H02G 3/065 174/653 |
| 4,508,407 A * | 4/1985 | Ball | H01R 13/622 439/312 |
| D285,048 S | 8/1986 | Beck | |
| D287,333 S | 12/1986 | Knudson | |
| 4,739,126 A * | 4/1988 | Gutter | H02G 3/065 174/655 |
| D303,710 S | 9/1989 | Neill | |
| D305,532 S | 1/1990 | Gallo et al. | |
| 4,919,370 A * | 4/1990 | Martin | F16L 5/00 174/153 G |
| 4,969,845 A * | 11/1990 | Hauchard | H01R 11/11 439/750 |
| 5,051,541 A * | 9/1991 | Bawa | F16L 33/223 174/655 |
| 5,117,479 A | 5/1992 | Erdman et al. | |
| D329,043 S * | 9/1992 | Rogers | D13/155 |
| 5,266,050 A * | 11/1993 | O'Neil | H02G 3/0625 174/659 |
| D347,467 S * | 5/1994 | Medvick | D23/262 |
| 5,529,508 A * | 6/1996 | Chiotis | H01R 13/5216 439/204 |
| 5,529,522 A * | 6/1996 | Huang | H01R 9/0527 439/440 |
| 5,536,184 A * | 7/1996 | Wright | H01R 9/0518 439/578 |
| D374,862 S | 10/1996 | Lee | |
| 5,586,910 A * | 12/1996 | Del Negro | H01R 9/0521 439/584 |
| D383,053 S | 9/1997 | Schrader et al. | |
| D383,378 S | 9/1997 | Schrader et al. | |
| D400,670 S | 11/1998 | Sorkin | |
| D412,738 S | 8/1999 | Kuwabara | |
| D414,462 S | 9/1999 | Peterson et al. | |
| D417,138 S | 11/1999 | Sauber | |
| D419,860 S | 2/2000 | Persson | |
| 6,043,432 A * | 3/2000 | Gretz | H02G 3/0691 16/2.1 |
| D424,919 S | 5/2000 | Sato et al. | |
| D435,830 S | 1/2001 | Cheng | |
| D453,816 S | 2/2002 | Sato et al. | |
| 6,348,657 B1 * | 2/2002 | Haslock | F16L 5/10 16/2.1 |
| 6,414,243 B1 * | 7/2002 | Korinek | H01R 4/22 174/87 |
| D464,409 S | 10/2002 | Nishio | |
| 6,468,100 B1 * | 10/2002 | Meyer | H01R 24/542 439/312 |
| 6,538,201 B1 * | 3/2003 | Gretz | H02G 3/0691 16/2.1 |
| 6,548,760 B1 * | 4/2003 | Stout, Jr. | F16L 25/14 138/177 |
| 6,583,357 B2 * | 6/2003 | Rubenstein | H02G 3/0666 16/2.1 |
| D483,094 S | 12/2003 | Wilk, Jr. et al. | |
| D495,404 S | 8/2004 | Wilk, Jr. et al. | |
| D500,475 S | 1/2005 | Noro et al. | |
| D504,312 S | 4/2005 | Peacock | |
| D517,904 S | 3/2006 | Alkalay | |
| D518,559 S | 4/2006 | Østergaard et al. | |
| D524,427 S | 7/2006 | Wilk, Jr. et al. | |
| 7,074,077 B2 * | 7/2006 | Sakaguchi | H01R 4/70 174/76 |
| D529,865 S | 10/2006 | Lapere | |
| D530,669 S | 10/2006 | Shing | |
| D573,537 S | 7/2008 | Svoboda et al. | |
| D574,067 S | 7/2008 | Pampinella et al. | |
| D577,674 S | 9/2008 | Long et al. | |
| D577,795 S | 9/2008 | Smith et al. | |
| D584,228 S | 1/2009 | Strickland | |
| D592,596 S | 5/2009 | Kolton | |
| D599,289 S | 9/2009 | Roos | |
| D599,894 S | 9/2009 | Price et al. | |
| D606,494 S | 12/2009 | Holliday | |
| D607,547 S | 1/2010 | Maier et al. | |
| D614,270 S | 4/2010 | Green et al. | |
| D623,142 S | 9/2010 | Amidon | |
| D624,019 S | 9/2010 | Victor | |
| D624,508 S | 9/2010 | Amidon | |
| 7,841,630 B1 | 11/2010 | Auray et al. | |
| D631,848 S | 2/2011 | Montena et al. | |
| 7,933,165 B2 * | 4/2011 | Thompson | G01V 1/201 114/249 |
| D637,697 S | 5/2011 | Steiner | |
| D647,391 S | 10/2011 | Barrese | |
| D649,862 S | 12/2011 | Arvinte et al. | |
| D650,052 S | 12/2011 | Drenth | |
| D651,696 S | 1/2012 | Giordano | |
| D654,150 S | 2/2012 | Bonhag et al. | |
| D665,471 S | 8/2012 | Fossum | |
| D676,940 S | 2/2013 | Kluss et al. | |
| D678,755 S | 3/2013 | Weidemann et al. | |
| D691,879 S | 10/2013 | Bernard | |
| 8,552,296 B2 * | 10/2013 | Joye | H01R 4/20 174/87 |
| D693,774 S | 11/2013 | Scime | |
| D719,646 S | 12/2014 | Melo | |
| 2002/0166691 A1 * | 11/2002 | Yaworski | H02G 15/18 174/68.3 |
| 2002/0185862 A1 * | 12/2002 | Louden | H02G 3/06 285/12 |
| 2003/0019649 A1 * | 1/2003 | Rubenstein | H02G 3/0666 174/654 |
| 2003/0094298 A1 * | 5/2003 | Morrow | B29C 47/0023 174/505 |
| 2004/0050574 A1 * | 3/2004 | Wu | F21S 8/065 174/659 |
| 2009/0218131 A1 * | 9/2009 | Sheehan | H02G 3/0625 174/665 |
| 2012/0068456 A1 | 3/2012 | Smith | |
| 2012/0129409 A1 * | 5/2012 | Drew | A61N 1/3752 439/843 |
| 2013/0020797 A1 | 1/2013 | King et al. | |
| 2013/0087381 A1 * | 4/2013 | Daughtry | H02G 3/0691 174/660 |

OTHER PUBLICATIONS

"Amico Stainless Steel Cable Glad Connector" May 17, 2012, Amazon.com, cited Apr. 13, 2015 http://www.amazon.com/Amico-tainless-6-0-12-0mm-Connector-Looknut/dp/B00843ULPY.

Office Action dated Apr. 27, 2015 in U.S. Appl. No. 29/482,009.

Office Action dated Mar. 26, 2015 in Canadian Design Application No. 158063.

Office Action dated Jan. 6, 2016 in US Design U.S. Appl. No. 29/482,009.

\* cited by examiner

QUICK LOCK TUBE SECURING SYSTEM USING CONNECTOR, LOCKING ELEMENT, AND ENGAGING PORTION

CROSS-REFERENCE

This application claims priority to U.S. provisional patent application Ser. No. 61/906,214, filed on Nov. 19, 2013, the disclosure of which is hereby incorporated by reference.

FIELD OF THE INVENTION

This invention relates to a system for connecting one or more tubes using a quick lock connector.

BACKGROUND

Hollow-tubed systems are used in a variety of applications. For example, Electrical Metallic Tubing ("EMT") conduit systems include elongate, thin walled, non-threaded tubes that are usually formed of metal. EMT tubes are used to enclose electrical wires therein. Similar systems include Rigid Metal Conduit ("RMC"), Galvanized Rigid Conduit ("GRC"), Intermediate Metal Conduit ("IMC") and Polyvinyl Chloride ("PVC") conduit, Armored Cable:AC(BX), Metal Clad Cable:MC and Flexible Metal Cable:FMC. Other materials such as plastic, fiber or fired clay can be used as well.

A typical EMT, RMC, or other conduit system usually includes electrical junction boxes, a plurality of EMT tubes, and other electrical systems that are joined together with fittings to provide a continuous protected chamber for receiving electrical wires and their connections therein. These fittings join the tubes to the junction boxes, and they also are used to join two or more sections of tubes together.

Currently, fittings for joining these elements together have undue limitations. For example, one common fitting includes a connector body with an internally threaded compression nut screwed on to body of a fitting which has external male threads. The end portion of a tube is slidably received within the compression fitting, and a worker must tighten the compression nut to compress a steel gland ring pre-installed between a compression fitting body and compression nut to secure the tube within the fitting. In practice, workers can over-tighten some compression nuts to strip both female and male threads of a compression fitting this usually leave tube not secured or not locked in the position of a compression fitting. Alternatively, the worker can under-tighten the a compression nut to the male threads of a compression fitting, thereby allowing the tube to become disconnected over time and expose the wiring unsecured within the tube.

In some cases, when any exterior threads on a compression fitting body or interior threads on a compression nut are not threaded or machined properly, the exterior threads on the compression fitting body and interior threads on a compression nut will not engage or mate well. This misalignment can cause scraping along the entire compression fitting or a loose connection, thereby allowing the tube to become disconnected over time and expose the wiring unsecured within the tube.

Another common fitting includes a body with a perpendicularly mounted threaded set screw. The end portion of a tube is slidably received within the body of a set screw fitting, and a worker must tighten the set screw to secure the tube within the fitting. In practice, workers can over tighten some set screw placing excessive pressure on a localized portion of the tube. In some cases, this excessive pressure can damage the tube. Over-tightening one or two set screw can strip the female threads in the screw boss. Alternatively, the worker can under-tighten the set screw, thereby allowing the tube to become disconnected over time and expose the wiring secured within the tube.

A typical conduit system can have hundreds of these fittings, all of which require hand tightening of each compression nut and set screw on each fitting. The labor of performing this repetitive task can increase the overall cost of a project.

On the manufacturing side of making millions of pieces of these fittings, all of which require a section of tube cut into a defined length to form each compression nut. After forming a piece of tube into a compression nut, manufacturing workers must tap each nut with internal threads. In addition, each compression nut must be secured to a compression connector or a compression coupling. In addition, each compression connector or coupling body must be also be formed in a similar manner with threads being formed on one end of each connector and two threads being formed on each compression coupling.

Set screw type connectors or couplings require labor to punch holes and tap threads on each screw hole, thereby increasing the cost of production. With millions of set screw fittings, compression fittings including compression nuts currently being manufactured each year and each fitting being large and relatively heavy, the cost of energy used in production and transportation, and other transportation related expenses are high. Moreover, the couplings are usually zinc plated, and their relatively large size necessarily increases the amount of zinc plating used, thereby potentially increasing the adverse effects on the environment.

More recently, efforts have been made to provide a snap-in securing system for joining armored MC, AC (BX) and FMC cables to junction boxes and the like. Examples of these types of systems can be found in U.S. Pat. No. 3,272,539 to R. W. Asbury, Sr.; U.S. Pat. No. 3,858,151 to Paskert; U.S. Pat. No. 6,670,553 to Gretz; and U.S. Pat. No. 6,939,160 to Shemtov, all of the disclosures of which are hereby incorporated by reference.

In general, these fittings include a ferrule with one or more annularly mounted tabs or cantilevered snap clips extending therefrom. The tabs and cantilevered snap clips operably engage a portion of the surface of the armored MC, AC (BX), and FMC cables received therein. While these systems prevent the need for set-screws, they can become loose over time and they provide little alignment guidance to assure that they are properly set when installed.

SUMMARY

Thus, despite the known improvements to tubing joining systems, there remains a need to a quick-connecting tube engaging system that assists with proper alignment of each tube and evenly distributes the securing load around the entire circumference of each tube secured thereto.

In addition, there remains a need for a tubing joining system that can provide effective and reliable continuity of electricity from a quick-lock connector to a junction box or from quick lock coupling to two or multiple pieces of tubes throughout the entire tube joining system.

In addition, there remains a need for a tubing joining system that includes a securing fitting that cannot be over-tightened or under-tightened, but rather consistently provides the optimal securing force at each connection, which can save labor, energy, environment friendly at both manufacturing site and final fitting installation site.

An embodiment of the disclosed invention has a hollow-tube connecting system with a connector for securing the hollow tube to a structure or a coupling for securing two hollow tubes together, the connector has a body with a tapered interior edge and opening for receiving the tube therethrough. A locking wedge with a tapered exterior surface is received within the body.

In a disclosed embodiment, the locking wedge may have an opening and a plurality of spaced apart ball bearings inlaid in preformed apertures on the locking wedge for snugly receiving the tube therethrough. Inserting the tube into the wedge urges the plurality of spaced apart ball bearings to engage on the exterior surface of tube and move on the tapered interior edge of the body that makes the tube move inward to the bigger interior diameter of tapper body. When a force is applied urging the tube towards the smaller interior diameter of the tapered body, the resulting reaction force on the tube caused by the engaged plurality of ball bearings on the exterior surface of tube and ball bearings moving toward the smaller diameter of tapper interior surface on the connector body creates a friction force holding the tube in the connector. When the reaction force reaches a defined point, it can be called self-locking point. In the self-locking point, the annular tube is locked inside the locking wedge and connector body.

When an annular tube is inserted into the tapered and circular interior wall of the connector body, a geometric triangle is formed by the ball bearings serving as the medium between the annular tube and tapered interior surface of the connector body. When the tube moves toward the bigger diameter of the tapered connector body, it moves freely, but when it moves toward the smaller diameter of tapered connector body, the increased reaction force created from ball bearings movement on the tapered interior surface of connector body to a smaller diameter locks and holds the tube in place in the connector. On the disclosed quick lock coupling, the same locking system in the connector works the same to lock two pieces of tube on each side of a coupling.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

FIG. 26 is a cross-sectional view of the quick lock fitting of FIG. 1 with an optional insert received therein for operably receiving the threaded end of a tube (shown in broken lines) such as an Armored Cable AC(BX), Metal Clad Cable (MC), Flexible Metal Cable (FMC) or the like.

DETAILED DESCRIPTION

A rapid connecting system 40 for connecting tubes 42 to each other and to other structures using a quick lock connector 44 is shown in FIGS. 1-28 and described herein.

A. General Construction

Figures 1, 2:
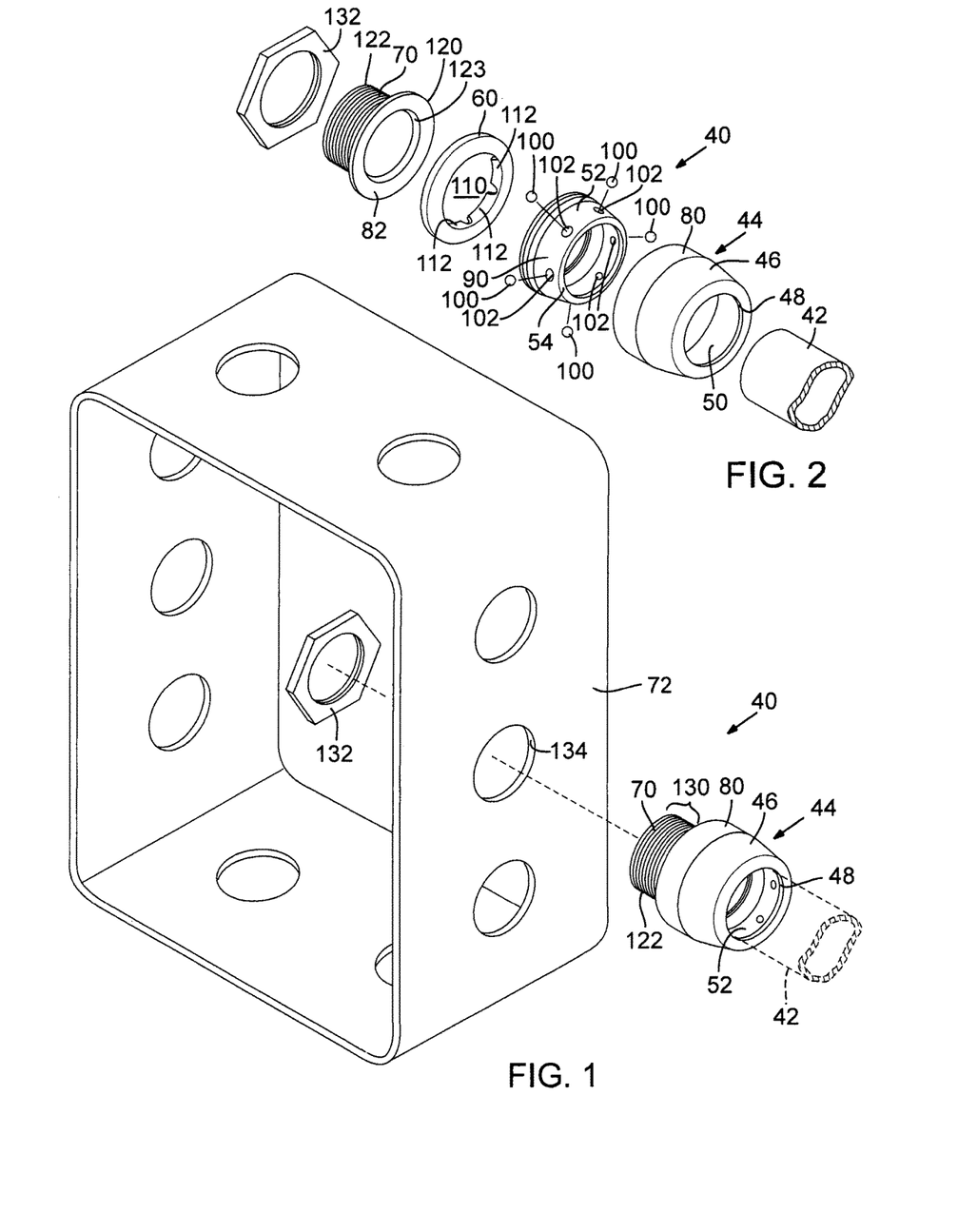
FIG. 1 is an exploded, isometric view of a quick lock fitting in accordance with an embodiment of the invention showing a tube operably secured thereto and a possible connection to a junction box.
FIG. 2 is an exploded, isometric view of the quick lock fitting of FIG. 1 showing a possible orientation relative to a tube.
Figure 3:
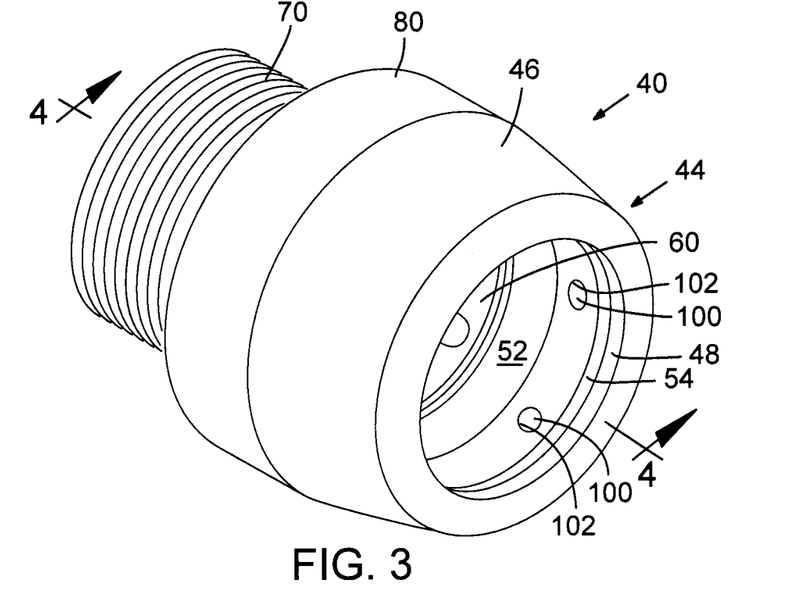
FIG. 3 is an enlarged, isometric view of the quick lock fitting of FIG. 1.
Figure 4:
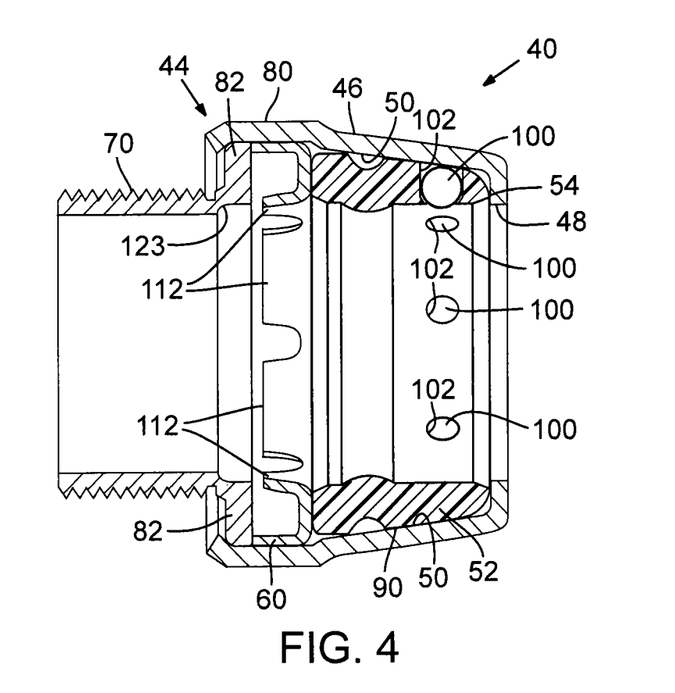
FIG. 4 is cross-sectional view of the quick lock fitting of FIG. 3, taken along line 4-4 of FIG. 3.
Figure 5:
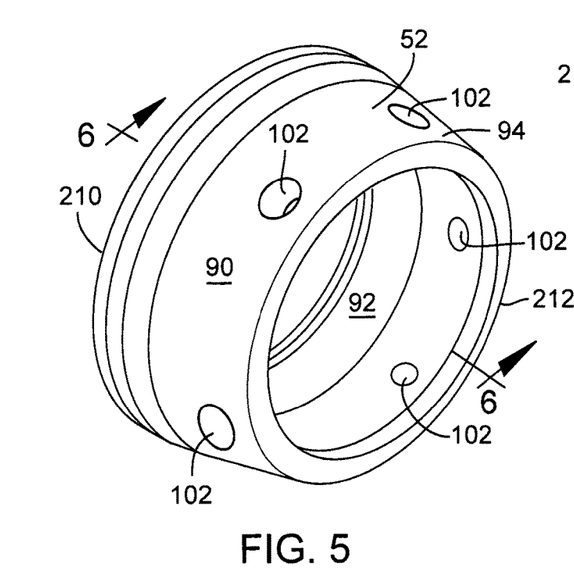
FIG. 5 is an isometric view of a tube engaging tapered, annular locking wedge in accordance with an embodiment of the present invention.
Figure 6:
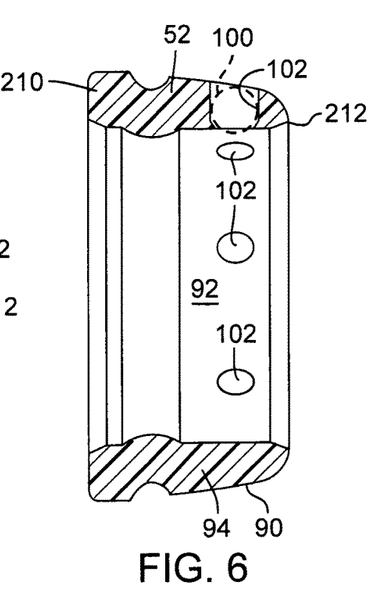
FIG. 6 is a cross-sectional view of the tube engaging tapered, annular locking wedge of FIG. 5 taken along line 6-6 of FIG. 5.

Referring to FIG. 2, the connector 44 has a connector body 46 with an opening 48 sized to slidably receive the tube 42 therethrough and a tapered interior surface 50 that narrows towards the opening 48. Inside the body 46 is a mating tapered locking wedge 52 that may have six or more or less roller bearings 100, that are preferably steel and preferably spherical balls, inlaid in the spaced-apart preformed apertures and an opening 54 for snugly receiving and engaging the exterior surface of the tube 42 and roller bearings move on the tapered interior wall 50 of body 46 therethrough and an annular guide ring 60 that operably engages the end of the tube 42 received therein.

The connector 44 may be fabricated with materials suitable for use with a conventional conduit tube such as EMT, RMC, GRC, Rigid, IMC, PVC and armored Cable: AC (BX), Metal Clad Cable: MC and Flexible metal cable: FMC.

Once the end of the tube 42 is secured to the locking wedge 52 and guide ring 60 by the installer simply inserting the end of the tube 42 into the opening 48 in the body 46, the roller bearings inlaid on the mating tapered locking wedge 52 engage the exterior surface of tube 42 and at the same time these roller bearings are against and move on the tapered interior surface 50 of body 46 thereby preventing the tube 42 from being removed backward to the smaller diameter of body 46 and from the connector 44. The body 46 may be connected to a base structure 70 to form a complete quick lock connector and with features for securing the connector 44 to another component 72 (FIG. 1). Each of these elements is discuss in greater detail below.

a. Connector Body with Tapered Interior

As best shown in FIGS. 1, 2 and 14-17, the connector body 46 defines a housing that encircles the end of the tube 42 and provides a chamber 79 for receiving the other components of the connector 44 therein. The tube 42 preferably has a circular cross-section, and the opening 48 in the connector body 46 is circular to slidably receive the end of the tube 42 therethrough.

The interior surface 50 of the connector body 46 is tapered to get smaller as it approaches the opening 48 and body 46 is tapered to get bigger as it approaches to a base engaging portion 80. The taper angle is preferably between 3 to 25 degrees, inclusive. More preferably, the taper angle is between 8 to 12 degrees, inclusive.

The connector body 46 includes a base engaging portion 80 opposite the opening 48. The base engaging portion 80 includes attachment features for securing the body 46 to the base structure 70 such as by compression, pressing, rolling, riveting or the like. A shoulder 82 may also be provided in the base engaging portion 80 for operably receiving and engaging the guide ring 60 therein and connecting to the base structure 70.

The connector body 46 is formed with substantially rigid materials suitable for the particular type of tubing being used. For example, in cases where the tubing is EMT tubing, the body may be formed with suitable tubing that can work with EMT tube or the like.

b. Tapered Locking Wedge

As best shown in FIGS. 2, 4-8, and 18-19, the tapered locking wedge 52 is formed of resilient material such as rubber, plastic or the like, and has a tapered exterior surface 90 and has plurality of spaced apart roller bearings, that are preferably substantially spherical balls and preferably made of steel, that operably engage and mate with the tapered interior surface 50 of the connector body 46 (FIGS. 14 & 15) A through opening 92 extends through the tapered locking wedge 52 to define an annular locking wedge wall 94. The opening 92 is sized to receive the end of the tube 42 as it is slid through the opening 92.

Figure 16:
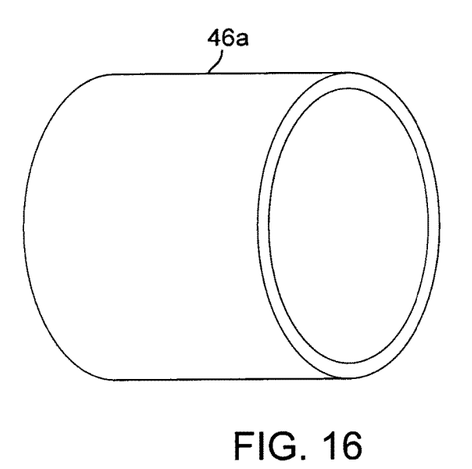
FIG. 16 is an isometric view of an annual base forming a portion of the annular connector body of FIG. 14.
Figure 17:
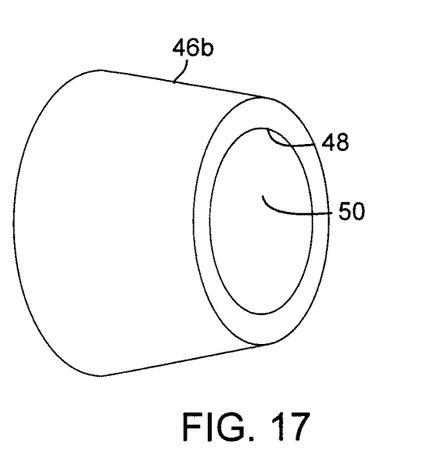
FIG. 17 is an isometric view of the tapered portion of the connector body of the annular connector body of FIG. 14.

A plurality of spaced apart bearings 100, such as rigid ball bearings, may be rotatably secured within apertures 102 in the wall 94 of the locking wedge 52 such that the bearings extend inwardly to engage the exterior surface of the tube 42 and move against the interior wall 50 of connector body 46 as it is slid though the opening 92 in the locking wedge 52 and facilitate insertion of the tube 42 and move along with tube 42 through the locking wedge 52 toward guiding ring 60. More preferably, the bearing includes steel balls and each ball is spaced equal distance apart from the other balls along the circumference of the locking wedge wall as best shown in FIG. 16. The diameter of each steel ball is preferably between 0.5 millimeter (mm) to 10 millimeter (mm), inclusive.

Figure 7:
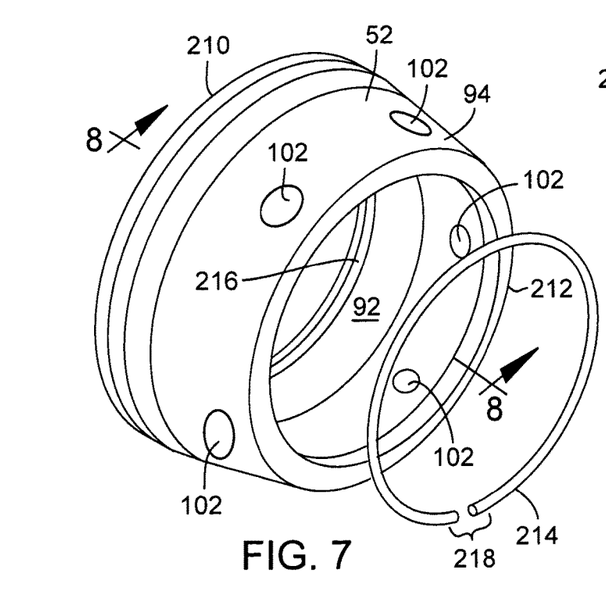
FIG. 7 is an exploded, isometric view of a tube engaging tapered, annular locking wedge in accordance with an alternative embodiment of the present invention showing a possible resilient ring operably secured thereto.
Figure 8:
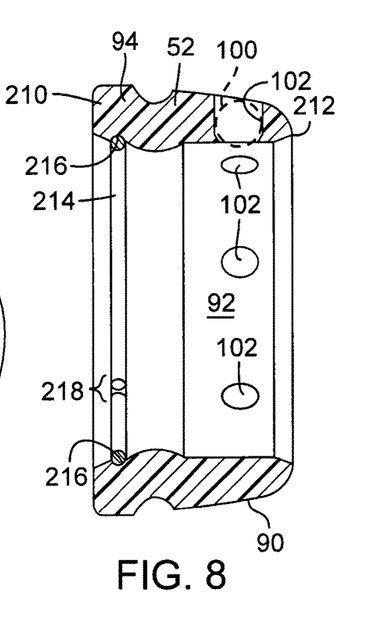
FIG. 8 is a cross-sectional view of the tube engaging tapered annular locking wedge of FIG. 7 taken along line 8-8 of FIG. 7 and shown with the resilient ring secured thereto.

Referring to FIGS. 7 & 8, the tapered locking wedge 52 can have a base end 210 and an opposite tapered end 212, and an optional resilient expansion ring 214 can be operably received within a groove 216 in the base end 210 of the locking wedge 52. The expansion ring 214 includes an opening 218 to allow the ring 214 to be compression to allow insertion into the groove. The ring is preferably substantially circular and formed of spring steel or the like. When released, it seeks to expand towards its neutral position thereby urging the base end of the locking wedge 52 toward the connector body 46 further holding the locking wedge in place within the connector body 46.

c. Guide Ring

Figure 18:
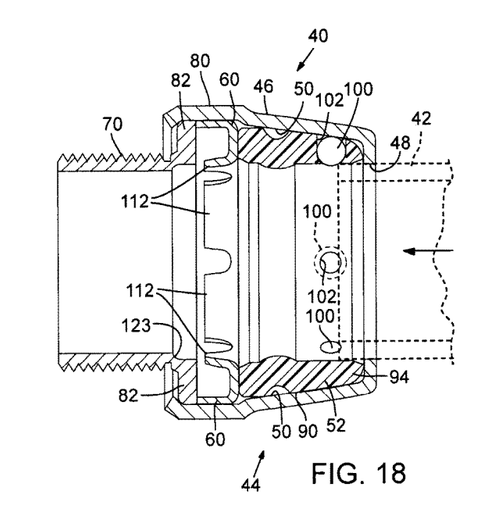
FIG. 18 is a cross-sectional view of the quick lock fitting of FIG. 3 showing possible alignment of a tube (shown in broken lines) being inserted into the quick lock fitting.
Figure 19:
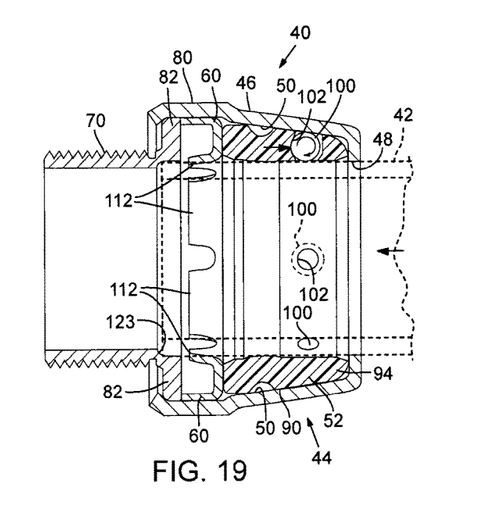
FIG. 19 is a cross-sectional view of the quick lock fitting of FIG. 18, showing a possible attached position of the tube (shown in broken lines) in the quick lock fitting in accordance with an embodiment of the present invention.

As best shown in FIGS. 2, 18 & 19, the annual guide ring 60 provides stability and support to the tube 42. The ring 60 is preferably formed of a durable material such as metal, plastic or the like, and it includes a ring opening 110 for snugly receiving the end of the tube therethrough.

A plurality of spaced apart protrusions 112 or tabs extend from the ring 60 towards the opening 110. The protrusions 112 are angled away from the opening 48 in the connector body 46 so that they allow the tube 42 to be inserted through the ring opening 110 and grasp the tube 42 should it be moved in a perpendicular direction away from the opening in the connector body 46. Preferably at least 4 to 12 protrusions 112 are spaced equal distance around the circumference of the guide ring 60 as shown. By snugging and grasping the exterior surface of tube 42 through a plurality of spaced apart protrusions 112 or tabs extend from the ring 60, it provides excellent continuity of electric and low electric resistance on connector 44 throughout tube 42 to a connected structure 72 (FIG. 1) or the like, which is important for an electrical connector or coupling to perform during special circumstance, like electricity leak or short of wire and power line.

The outer diameter of the guide ring 60 is sized to be snugly received within the base engaging portion 80 of the connector body 46. Accordingly, the ring opening 110 remains aligned along the longitudinal center line of the connector 44 and the opening 48 in the body 46. The process of inserting an end of a tube through the opening 48 in the body 46, then the opening 92 in the locking wedge and finally the opening 110 in the guide ring 60 necessarily urges the tube 42 into proper alignment along the longitudinal centerline of the connector 44 and finally stop at tube stop 123 (FIGS. 2, 9, 10, & 19) of base structure 70 (FIGS. 2 and 9).

d. Base Structure

Figures 9, 10, 11:
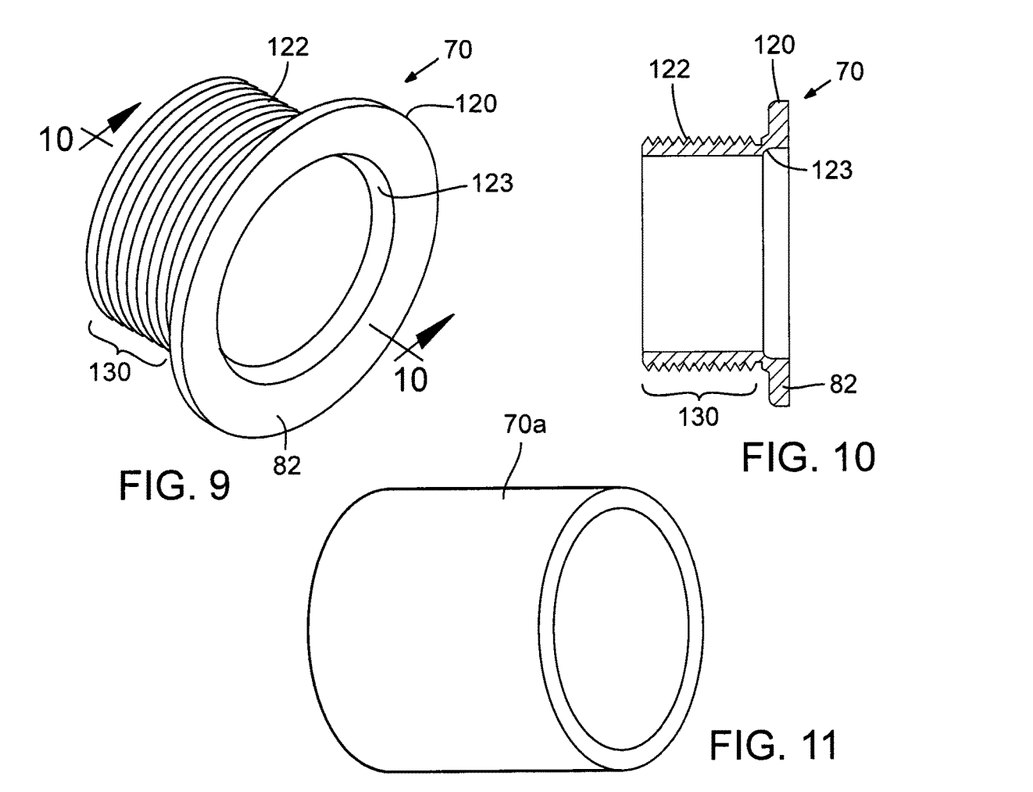
FIG. 9 is an isometric view of a threaded base with collar in accordance with an embodiment of the present invention.
FIG. 10 is a cross-sectional view of the threaded base with collar of FIG. 9 taken along line 10-10 of FIG. 9.
FIG. 11 is an isometric view of a base in accordance with an embodiment of the present invention.
Figure 12:
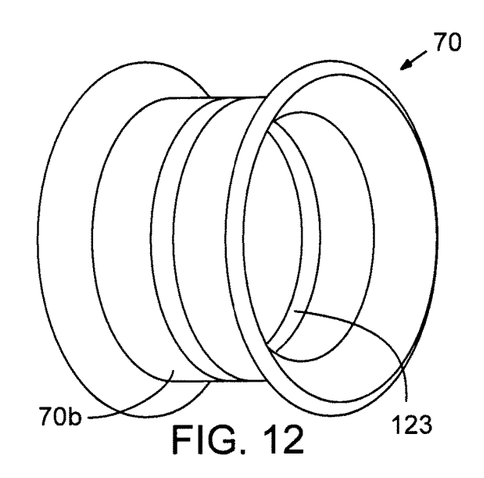
FIG. 12 is an isometric view of a base with two opposed collars in accordance with an embodiment of the present invention.
Figure 13:
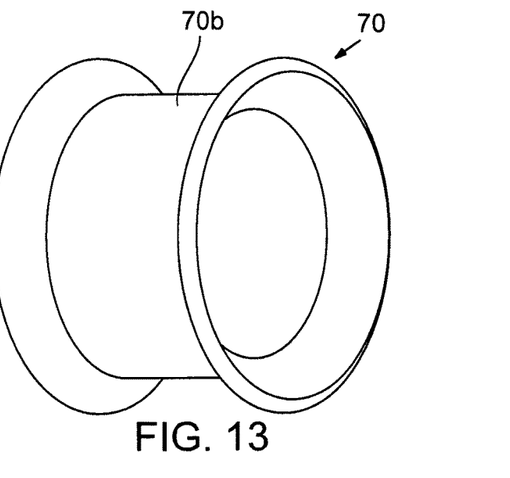
FIG. 13 is an isometric view of an alternative possible base with two opposed collars in accordance with an embodiment of the present invention.

As best shown in FIGS. 2, 9 and 10, the base structure 70 includes a connector body engaging portion 120 and an object engaging portion 122. A shoulder 82 of the base structure 70 is operably secured to the base engaging portion 80 of the connector body 46 thereby holding the tapered locking wedge 52 and guide ring 60 in place within the chamber 79. The tube stop 123 (FIG. 12) on the base structure 70 is formed by dies to receive the end of tube 42 after tube 42 pass through guiding ring 60 the tube stop 123 stops the end of tube 42 from being inserted any further into the connector.

The object engaging portion 122 can be configured to mount to a variety of structures. For example, the object engaging portion 122 can include a threaded element 130 and locking nut 132 for securing the connector 44 through a hole 134 in a conventional electrical junction box 72 (FIG. 1) or the like as shown in FIG. 1. When the object engaging portion of 122 does not include any threads elements 130 and lock nut 132, it can secure the connector 44 through inserting the object engaging portion 122 into a EMT tube, RMC, GRC, IMC and by using welding or riveting 122 to a EMT tube, RMC, RGC or IMC. This can easily fabricate the whole piece of EMT tube, RMC, RGC or IMC into a pre-fabricated, pre connector or coupling installed conduit and ready to connect to another piece of tube or conduit.

Figures 20, 21, 22:
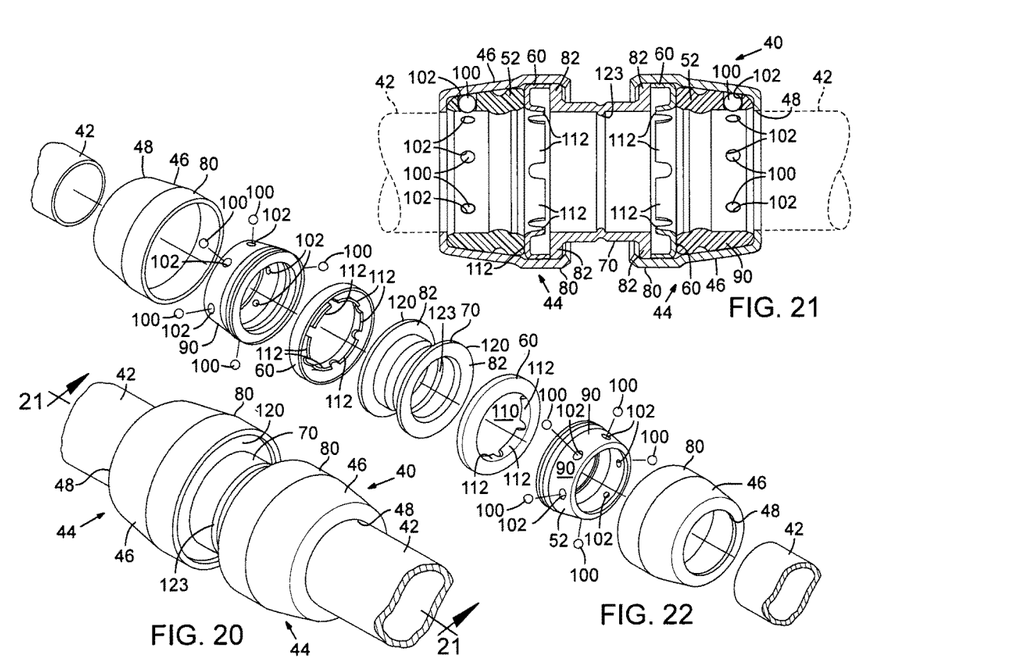
FIG. 20 is an isometric view of a quick lock coupling system in accordance with an alternative embodiment of the present invention.
FIG. 21 is a cross-sectional view of the quick lock coupling system of FIG. 20 taken along line 21-21 of FIG. 20 and showing a possible orientation relative to two tubes (shown in broken lines).
FIG. 22 is an exploded view of the quick lock coupling system of FIG. 20.

Alternatively, the object engaging portion 122 can include two or more connector body engaging portions 120 as shown in FIGS. 20-25 thereby allowing at least two connectors 44 to be operably secured thereto and thereby allowing two tubes 42 to be joined together to make a quick lock coupling as shown in FIGS. 22. In addition, and referring to FIG. 25, a threaded Rigid Coupling 150 can operably secure the object engaging portions 122 of two base structures 70 thereby joining two connectors 44 together. The die formed groove tube stop 123 (FIGS. 12, 20 & 21) at the center of the object engaging portion 122 of two base structures 70 can stop ends of tubes 42 after the two tubes pass through respective guiding rings 60.

Figures 23, 24, 25:
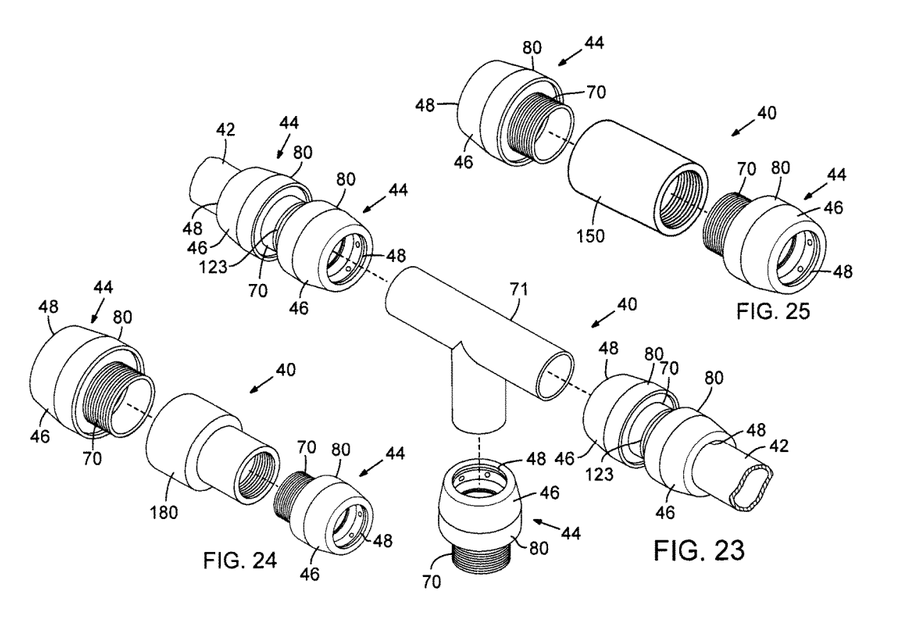
FIG. 23 is an isometric view of an alternative possible configuration of three quick lock fittings of FIG. 1 on a T-shaped member.
FIG. 24 is an isometric view of a possible configuration of two different sized quick lock connectors of FIG. 1 on a threaded rigid coupling.
FIG. 25 is an exploded view of the possible configuration of two same sized quick lock connectors of FIG. 1 on a threaded rigid coupling.

It can be appreciated that the tube 42 used need not be substantially straight. For example, the tube 42 can be T-shaped 71 (FIG. 23), U-shaped, or elbow shaped. In addition, a connection coupling 180 having different diameters on each end can be used to joint two different sized connectors 44 together as best shown in FIG. 24.

e. Threaded Tube Attachment Structure

Figure 26:
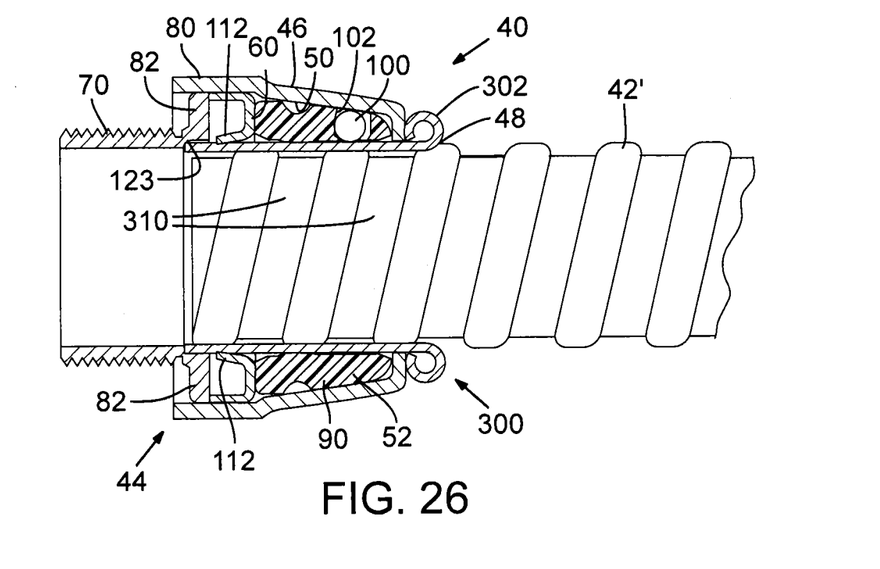
Figure 27:
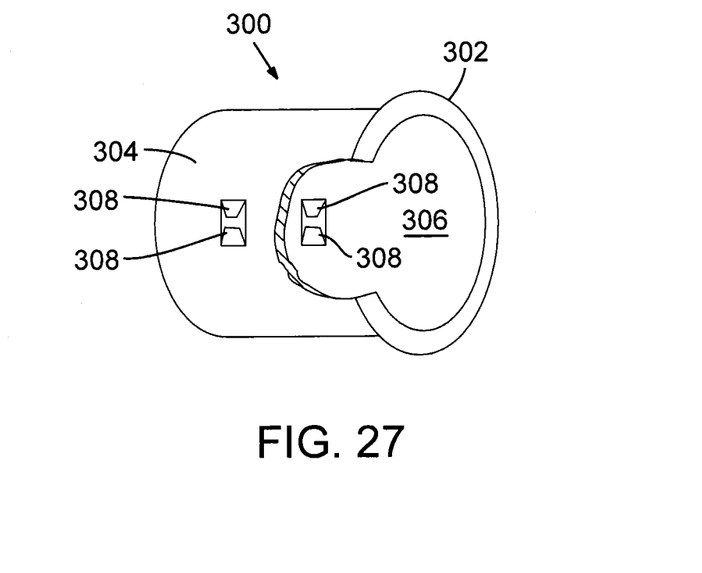
FIG. 27 is an isometric view of the insert received within the quick lock fitting in FIG. 26 with a portion broken away to show internal detail.

Referring to FIGS. 26 & 27, a threaded tube attachment structure 300 that allows a threaded tube 42' to be operably secured to a connector 44 is shown. Exemplar threaded tubes include armored cable and metal clad cables and the like. The attachment structure 300 includes an annular insert 302 that has a smooth outer surface 304 that is sized to be operably connected to the connector 44 as previously described. The interior surface 306 of the insert 302 includes protrusions 308 or threads (not shown) that are sized to operably engage the mating threads 310 of a threaded tube.

An installer can mount a threaded tube 42' to a connector 44 by first inserting the annular insert 302 into the connector 44 and then threading the threads 310 of the tube 42' into the annular insert 302 in the connector 44. Alternatively, the installer can first thread the annular insert 302 onto an end of the threaded tube 42' and then insert the threaded tube 42' with the annual insert 302 installed into a connector 44.

f. Exemplar Method of Fabricating Connector Components

An exemplar method of fabricating the components forming the connector using machining is herein described. Other methods such as molding could also be used to form these components.

Figure 14:
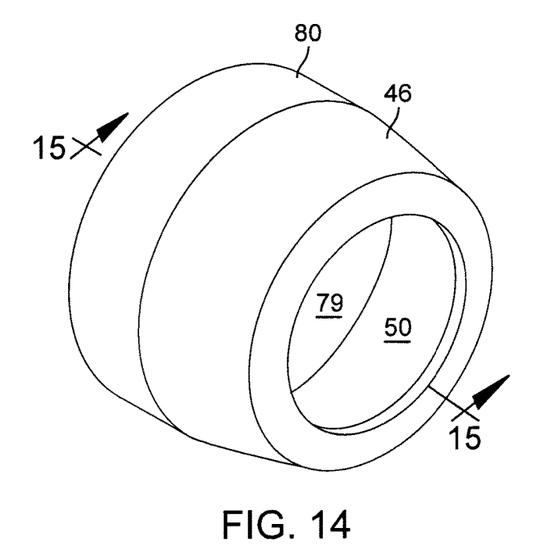
FIG. 14 is an isometric view of a tapered, annular connector body in accordance with an embodiment of the present invention.
Figure 15:
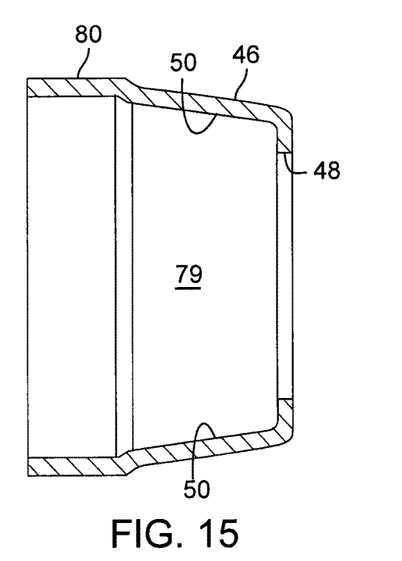
FIG. 15 is a cross-sectional view of the connector body of FIG. 14 taken along line 15-15 of FIG. 14.

The connector body 46 is shown being formed from a section of cylindrical tube 46a in FIG. 16. The cylindrical tube 46a is first machined to form a tapered segment 46b, and then the shoulder is machined into the tapered segment 46b (FIG. 17) to form the final connector body 46 (FIGS. 14 & 15). Similarly, the base structure 70 is formed from a second section of cylindrical tube 70a (FIG. 11). The second section of cylindrical tube 70a is machined to put one (FIG. 9) or two opposite (FIGS. 12 & 13) collars on the end(s) defining a collared cylinder 70b. Tube stops 123 (FIG. 12) may be machined into the collard cylinder to define a partially machined component 70c. Finally, the attachment structures such as threads or the like are machined into the partially machined component to form the base structure 70.

The guide ring 60 may be formed from a substantially planar blank that has been cut in to a predefined shaped, and then pressed to define the guide ring 60 with protrusions 112 as shown and previously described.

B. Use and Operation

Having described the elements of the present invention, their use and function becomes apparent. An installer inserts an end of a hollow tube 42 into the opening 48 in the connector body 46 and pushes the end of the tube 42 into the opening 46. The tube 42 operably engages plurality of spaced apart roller bearings, that are preferably steel spherical balls, on the locking wedge 52, at the same time, roller bearings inlaid in locking wedge 52 engage and move on the tapered interior surface of body 46, tube 42 continue to extend through the opening 92 in the locking wedge and the opening 110 in the guide ring 60. The protrusions 112 in the guide ring 60 hold the ring 60 onto the tube and end of tube 42 finally stops at tube stop 123 formed inside base structure 70. As soon as tube 42 enters tapered connector body 46, which preferably has an 8 to 12 degree tapered interior wall, and locking wedge 52, the steel ball bearings on 52 immediately engages on the exterior surface of tube 42. When steel ball bearings on locking wedge 52 move on the tapered interior surface of body 46, it creates friction force between steel ball bearings and tapered interior wall of body 46, which also creates and increase reaction force on the exterior surface of tube 42 thereby holding the tube 42 in the connector 44.

If a force is inadvertently applied in a direction that would pull the tube 42 out of the connector 44 or to the opening 92 of locking wedge 52 and the opening 48 of tapered connector body 46, the steel ball bearings move on the tapered interior surface of connector body 46 along with tube 42 backward to the smaller diameter of tapered connector body 46. The resulting friction force created by this action causes a reaction force to compress against the exterior surface of tube 42, when steel ball bearings move to the self-locking position, or when the reaction force reaches a point to have enough compression against the exterior surface of tube 42, the annular tube 42 thereby is locked in the position inside of the connector 44. Whenever a force is applied in this direction, the smaller diameter of tapered connector body 46 with tapered interior surface seeks to pull tube 42 out of connector 44, but the plurality of steel ball bearing lock tube 42 inside locking wedge 52.

An installer may easily insert the end of a tube 42 into a connector 44, with the guide ring 60 and tapered locking wedge 52. When the tube 42 moves inwardly to a bigger diameter on the tapered interior surface of connector body 46, steel ball bearings inlaid in the apertures of locking wedge 52 apply a holding force that is distributed throughout the circumference of the tube 42 thereby holding the tube 42 in place. When tube 42 moves backward to a smaller diameter of tapered interior surface of connector body 46, the steel ball bearings applying locking force in locking wedge 52 that locks tube 42 in the place. It can be appreciated that the connectors 44, tubes 42 and component engaging structures allow a complete quick lock tubing securing systems, such as an electrical conduit system to be completely, quickly, efficiently, cost effectively and easily connected without the need for securing compression nuts and set screws or the like.

Figure 28:
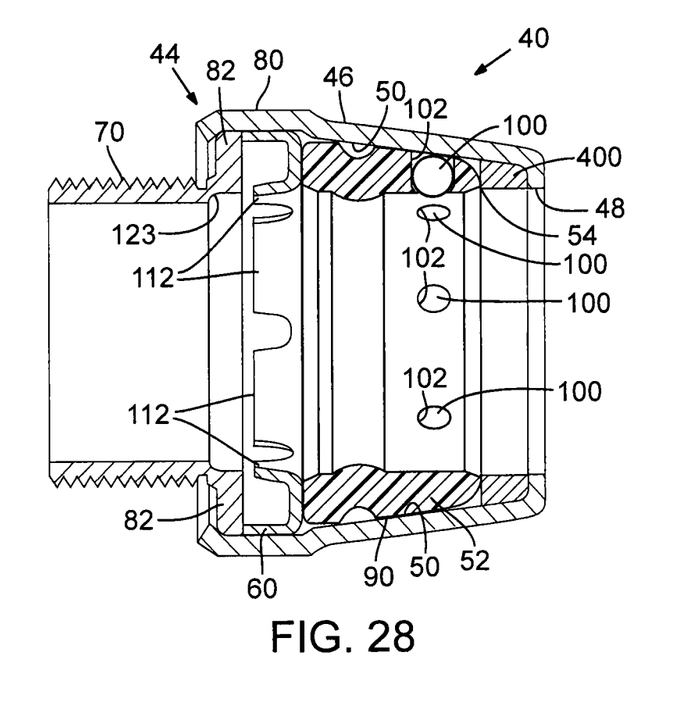
FIG. 28 is a cross-sectional view of an alternative embodiment of a quick lock fitting in accordance with an embodiment of the present invention.

One skilled in the relevant art will recognize that numerous variations and modifications may be made to the configurations described above. For example, as shown in FIG. 28, the connector 44 can include an elongated connector body 46 to define a larger chamber therein. A spacer 400 can be positioned within the elongated chamber along with the tapered locking wedge 52 so as to secure the wedge 52 in place within the chamber and prevent it from moving when the tube 42 is inserted therethrough. Alternatively, the spacer 400 can be integrally formed or molded with the wedge 52. Such modifications and additional embodiments can be made without departing from the scope of the present invention, as defined by the appended claims.

What is claimed is:

1. A hollow-tube connecting system comprising:
    a hollow tube;
    a connector for securing the hollow tube to a structure, the connector further comprising;
        a connector body having a tapered interior surface, the tapered interior surface causing the interior of the connector body to vary from a smaller size to a larger size, the interior surface defining an interior chamber, the connector body having an opening into the chamber for receiving the hollow tube, the opening being located at one end of the connector body, the one end corresponding to the smaller size of the interior surface,
        a locking element having a tapered exterior surface and positioned within the interior chamber, the locking element having an opening for receiving the hollow tube, wherein inserting the hollow tube into the connector body opening and then into the locking element urges the tapered exterior surface of the locking element against the tapered interior surface of the connector body and increases the hollow tube's resistance to being removed from the connector body; and,
        a structure engaging portion operative to secure the connector to the structure.

2. The hollow-tube connecting system of claim 1, further including a guide ring positioned within the interior chamber, the guide ring having a ring opening for receiving the end of the hollow tube and an outer diameter sized to engage the interior surface of the connector body and operative to hold the guide ring substantially parallel with the connector body opening.

3. The hollow-tube connecting system of claim 2, wherein the guide ring includes a plurality of tabs extending toward the center of the ring and angled away from the connector body opening.

4. The hollow-tube connecting system of claim 1, wherein said locking element includes an annular wall, the annular wall including a bearing operably secured within the annular wall, the bearing positioned to engage the hollow tube.

5. The hollow-tube connecting system of claim 4, wherein said bearing includes a plurality of rotatable bearings positioned along the circumference of the annular wall.

6. The hollow-tube connection system of claim 1, wherein the hollow tube is an electrical conduit.

7. The hollow-tube connecting system of claim 6, wherein the electrical conduit is selected from the group consisting of Electrical Metallic Tubing, Rigid Metal Conduit, Galvanized Rigid Conduit, Intermediate Metal Conduit, Polyvinyl Chloride conduit, plastic, fiber and fired clay.

8. The hollow-tube connecting system of claim 1, wherein the structure engaging portion includes a threaded element and nut for securing the connector to a hole in an electrical junction box.

9. The hollow-tube connecting system of claim 1, wherein the structure engaging portion includes two connector engaging portions for operably securing two connectors together.

10. The hollow-tube connecting system of claim 1, wherein the tube is selected from the group consisting of a straight section, a T-shape, a U-shape, and an L-shape.

11. The hollow-tube connecting system of claim 1, wherein said locking element is formed of a resilient material.

12. The hollow-tube connecting system of claim 11, wherein the resilient material is selected from the group consisting of rubber and plastic.

13. The hollow-tube connecting system of claim 1, further including a ring spring having a neutral position and operably secured to the locking element, said ring spring compressing the locking element toward the connector body in its neutral position.

14. The hollow-tube connecting system of claim 13, wherein said ring spring is substantially circular and includes an opening to allow the spring to be deflected from its neutral position.

15. A hollow-tube connecting system comprising:
    a hollow tube;
    a connector for securing the hollow tube to a structure, the connector further comprising;
        a connector body having a tapered interior edge and defining an interior chamber, the tapered interior edge having a taper angle between 3 to 25 degrees, inclusive,
        a connector body opening into the interior chamber for receiving the hollow tube,
        a locking element having a tapered exterior surface and positioned within the interior chamber, the locking element having a plurality of ball bearings inlaid in apertures of the locking element, the ball bearings having a diameter between 0.5 millimeters (mm) and 10 millimeters (mm), inclusive;
        a locking element opening for receiving the hollow tube, wherein the locking element is such that inserting the hollow tube into the locking element opening causes the ball bearings to engage the exterior surface of the hollow tube and also urge the ball bearings against the tapered interior edge of the connector body; and,
        a structure engaging portion for operably securing the connector to the structure.

16. The hollow-tube connecting system of claim 15, further including a guide ring positioned within the interior chamber, the guide ring having a ring opening for receiving the end of the hollow tube and an outer diameter operative to engage the interior surface of the body and hold the guide ring substantially parallel with the body opening.

17. The hollow-tube connecting system of claim 15, wherein said locking element includes an annular wall, the annular wall including the apertures into which the plurality of ball bearings are inlaid.

18. The hollow-tube connecting system of claim 17, wherein said plurality of ball bearings are spaced apart from each other along the circumference of the annular wall and are rotatably secured within the apertures.

19. The hollow-tube connection system of claim 15, wherein the hollow tube is electrical conduit selected from the group consisting of Electrical Metallic Tubing, Rigid Metal Conduit, Galvanized Rigid Conduit, Intermediate Metal Conduit, Polyvinyl Chloride conduit, plastic, fiber and fired clay and armored cable: AC (BX), Metal Clad cable: MC and Flexible Metal cable: FMC.

20. The hollow-tube connection system of claim 15, where the taper angle is between 8 to 12 degrees, inclusive.

\* \* \* \* \*